United States Patent [19]
Fazio et al.

[11] Patent Number: 5,963,631
[45] Date of Patent: Oct. 5, 1999

[54] WAYSIDE COMMUNICATIONS SAFETY SYSTEM

[75] Inventors: Alfred E. Fazio, Havertown, Pa.; Charles S. Hall, Essex Fells, N.J.

[73] Assignee: National Railroad Passenger Corporation, Washington, D.C.

[21] Appl. No.: 08/893,178

[22] Filed: Jul. 15, 1997

Related U.S. Application Data

[60] Provisional application No. 60/022,127, Jul. 16, 1996.

[51] Int. Cl.⁶ .............................. H04M 11/04; H04M 3/42
[52] U.S. Cl. .............................. 379/202; 379/37; 455/404
[58] Field of Search .................................... 379/202, 186, 379/187, 201, 205, 216, 217, 233, 37–38, 45–51; 246/7; 455/404, 517; 340/531, 532, 533, 539

[56] References Cited

U.S. PATENT DOCUMENTS

| | | | |
|---|---|---|---|
| 4,176,254 | 11/1979 | Tuttle et al. | 379/45 |
| 4,252,997 | 2/1981 | Lodas et al. | 379/40 |
| 4,724,538 | 2/1988 | Farrell | 455/404 |
| 4,788,711 | 11/1988 | Nasco, Jr. | 455/404 |
| 4,817,126 | 3/1989 | Hendershot | 455/463 |
| 4,912,757 | 3/1990 | Ossandon | 379/217 |
| 5,086,463 | 2/1992 | Vesely et al. | 379/388 |
| 5,283,546 | 2/1994 | Scop et al. | 379/37 |
| 5,377,256 | 12/1994 | Franklin et al. | 379/45 |

OTHER PUBLICATIONS

"Communication and Control System for the New York City Railroad Tunnels", by Joseph J. Grella, P.E. et al, Conference on Railway Communication held in Basil, Switzerland, 1994.

Primary Examiner—Harry S. Hong
Assistant Examiner—Benny Q. Tieu
Attorney, Agent, or Firm—Lowe Hauptman Gopstein Gilman & Berner

[57] ABSTRACT

A wayside communications safety station is used along rail lines by passengers in distress or crew members, for routine communications among maintenance personnel, and for communications among emergency services personnel. The system comprises a telephone, connectable to a telephone line, to initiate and receive telephone service, and a plurality of manually actuable switches connected to the telephone to initiate a direct dial telephonic signal. At least one voice powered system jack is connectable through the safety station to a voice-powered communications system. A further manually actuable switch is connectable to a direct current traction power control circuit adapted to supply electrical energy to a train, to selectively actuate the control circuit. A safety station additionally includes ability to reset power to the control circuit.

11 Claims, 6 Drawing Sheets

WAYSIDE COMMUNICATIONS SAFETY SYSTEM

RELATED APPLICATIONS

This application claims priority from provisional patent application Ser. No. 60/022,127, filed Jul. 16, 1996, entitled WAYSIDE COMMUNICATIONS SAFETY SYSTEM, which is incorporated herein by reference.

TECHNICAL FIELD

The present invention relates generally to a wayside communications safety system for communication with and between other safety stations located at a plurality of fixed sites with, central stations, or intermediate receiving stations within a railroad environment and, more particularly, to such systems providing one-way and two-way communications services and summoning of emergency services.

BACKGROUND ART

There are many occasions when the need for reliable communications along railroad by-ways is necessary for both routine maintenance and emergency services. Radios are commonly used by maintenance workers, however, radio communications are not always effective in environments where the limited range of radio signals is greatly affected, for example, within railway tunnels. Similarly, the use of radios by emergency services personnel, for example fire and medical, are problematic both in communications among such personnel at the scene of an emergency and with a remote command post. Additionally, the ability to deliver emergency voice communications to passengers stranded along a by-way, for example in a tunnel or on a bridge, has been extremely difficult absent an accessible public address system.

Many rail systems are powered by electricity, with trains connecting to a high voltage source of electricity either by overhead linkage and/or by means of a third rail. Dangerous and life threatening situations arise when passenger and railway personnel are exposed to these high voltage sources. Restoration of high voltage power must be performed manually at the scene. Rapid disconnection of third rail electrical power, for example, has typically been accomplished using manually controlled dual-lever pull stations located at intervals along a rail line. Open access of the dual-lever pull stations may also be subject to misuse by pranksters and corruption by vandals.

Call boxes are used to provide certain communications for various points along a railway line, particularly in tunnels and on bridges or at stations with central stations or intermediate receiving stations. Vandalism of such call boxes is a problem ranging from defacement or destruction to theft of the units. In addition, call boxes have also been subject to environmental abuse from ambient moisture and ambient particulate. To determine whether operation of a call box has been compromised, periodic field testing is required to ensure performance by maintenance personnel, who must then repair and/or replace the units in the field. Remote testing of the units has typically not been available, nor have the units been mounted such that they may quickly and easily be disconnected by maintenance personnel.

In some localities emergency services personnel have set up a system whereby special plug-in handsets are utilized with a call box to set up local party lines. For example, a fire department may use such a system to communicate and coordinate emergency crews in a crisis vicinity, such as a tunnel where radio communications might not be effective, as well as connecting with a command center. These specialized voice connections have for the most part not been incorporated into permanently installed call box stations.

Emergency call boxes have evolved in functionality and technology. For example, U.S. Pat. No. 4,176,254 discloses an emergency roadside telephone system whereby wireless methods of communications are utilized. The call box disclosed in this patent has a transmitter and receiver handset for voice communications and a plurality of emergency pushbuttons identifying various emergency services, for example, fire, ambulance, road service or operator. By depressing one of the emergency pushbuttons, the unit automatically dials a preprogrammed number for the requested service. However, this unit only permits wireless calls to be placed via a central station. The user must communicate with the handset using wireless communications which is not suitable where tunnel-type environments are involved. The unit is not vandal resistant, does not allow for sound activated communications by various emergency services, and lacks the ability to function as a public address system. Also, the unit does not allow for inter-unit communications, that is, users such as maintenance crews cannot utilize the call box of this patented device for communications to other call boxes along the wayside.

Another type of call box disclosed in U.S. Pat. No. 5,283,546, although directed to a vandal-resistant call box, has many limiting features, including the use of wireless communications, and the inability to communicate with anyone other than an emergency operator. This call box also lacks the functionality that would allow the user, for example, to communicate with other call boxes, or to place telephone calls to locations other than an emergency operator, and further fails to permit alternate voice activated communications. Public address functions and remote activation of the call box are also not considered.

An emergency communications call box must also be accessible to a user while not interfering with ambient traffic, for example vehicles or people. In a tunnel environment, space for mounting materials and equipment is severely limited, and clearance must be maintained so as not to interfere with the general use of the tunnel. Mounting surfaces may vary within tunnels and along waysides, requiring a call box and a mounting bracket that are adaptable to various angles, slopes and clearance limitations.

Accordingly, there exists a need for a wayside safety station that has multi-functionality, is easy to use, resistant to environmental abuse, vandalism and theft, can be remotely activated and tested, and can be quickly and easily replaced for repair or maintenance.

It is accordingly a primary object of the present invention to improve communications services along transportation corridors through a multifunctional communications safety station that, can be mounted and used in a tunnel environment, is resistant to vandalism, is not limited by the relatively short range of radio signals, and can deliver emergency and routine voice communications to a user.

Another object is to permit voice communications between a wayside communications safety station and other wayside communications safety stations, and between a wayside communications safety station and other telephone terminals.

A further object is to provide an accessible pushbutton on the safety station that allows a user to quickly and safely disconnect direct current traction power used for powering electric transportation vehicles.

Still another advantage is the ability of the station to function as a public address system, permitting passengers and others within the vicinity of the safety station to receive instructions from personnel responding to an emergency or other situation requiring public address.

Yet another object is the ability to make non-emergency public address announcements affecting listeners in hearing range.

Still another object is the ability of a safety station to be remotely activated to enable a caller to the safety station to monitor ambient sounds.

Another object is to facilitate emergency party line voice communications through the safety station.

A further object is to provide a mounting bracket that is adaptable to be attached to mounting surfaces of varying slope, allowing the safety station to be mounted as close to the mounting surface as possible.

Still another object is a safety station that can be quickly and easily attached to or removed from a mounting bracket, making repair and replacement cost effective.

Still another object is integration of emergency call functions with routine communications functions among maintenance workers, emergency power disconnects, telephone functions, and sound powered communications into one unit.

Still another object is to permit an operator at a central station to send diagnostic signals to the safety station to test and verify the proper working order of the unit, thereby facilitating maintenance and minimizing down time of the unit.

An additional object of the invention is to minimize external access to moving parts, through fabrication of a safety station having improved strength and resistance of components exposed to the ambient rugged and hostile environment.

SUMMARY OF THE INVENTION

The present invention concerns a wayside communications safety station for use along rail lines by passengers in distress or crew members, for routine communications among maintenance personnel, and for communications among emergency services personnel. The nature of the distress may range from train vehicle breakdown to life threatening emergencies such as rail accidents, any of which would require varying degrees of emergency assistance. The need for a wayside communication safety station that is highly reliable, multifunctional and vandal resistant is of paramount importance. Additionally, the safety station was designed to be resistant to ambient moisture and ambient particulates, thereby making it capable of being utilized in locations where weather might be of concern.

The wayside communications safety station was designed to provide single-action access to emergency assistance communication. Emergency and routine functions of the safety station include:

- a "Push for Help" emergency pushbutton and speakerphone function which is easily accessible to an untrained person requiring emergency assistance;
- access to plug-in jacks for use with voice-activated communications handsets commonly used by Fire Department and other emergency services organizations to access local party lines in an emergency;
- a pushbutton to locally disconnect electrical traction power in the event of an emergency requiring power to be discontinued;
- a means for resetting the disconnected electrical traction power at the safety station utilizing a code entered via a keypad. The power can also be restored from another location by calling the safety station and remotely entering the reconnect code;
- a maintenance party line whereby maintenance personnel within a predetermined zone can lift a handset, depress a pushbutton, and talk to other maintenance personnel at other safety station within the zone without the need to dial unique extension numbers or operator assistance;
- a ring-down line permitting the user to lift the handset and actuate a direct-dial function to communicate with the power director at a command center; and
- a dial extension function, whereby a user at a safety station can use the safety station as an extension telephone on the phone system, and calls can be placed without operator assistance.

In addition, the safety station can also function as a public address system, whereby alerts or announcements can be broadcast within a zone. Broadcasts may originate from the local safety station or remotely from another safety station or command center. In this way announcements may be broadcast alerting people in the vicinity of the safety station the status of an emergency or emergency instructions. Similarly, broadcasts can be made alerting or informing nearby personnel of local conditions, for example the status of electrical power or environmental conditions within the vicinity of the safety station.

The safety station can also be configured to monitor noise in the local environment, that is, the speakerphone can be activated such that only the microphone is active. A listener can monitor the local environment for various activity, for example, unauthorized intruders or vagrants.

The multifunctional safety station can thus be used as a local telephone, a local public address system, an emergency telephone, and an emergency power cutoff and power reset device, available for passengers and crew alike when needed.

Other objects and advantages of the present invention will become apparent from the following description of the preferred embodiment taken in conjunction with the accompanying drawings.

BEST MODE FOR CARRYING OUT THE INVENTION

The operation of the multi-function wayside communications safety station 10 of the present invention is described in connection with the environment in which the safety station is used and how it is utilized during normal operation.

Figure 1:
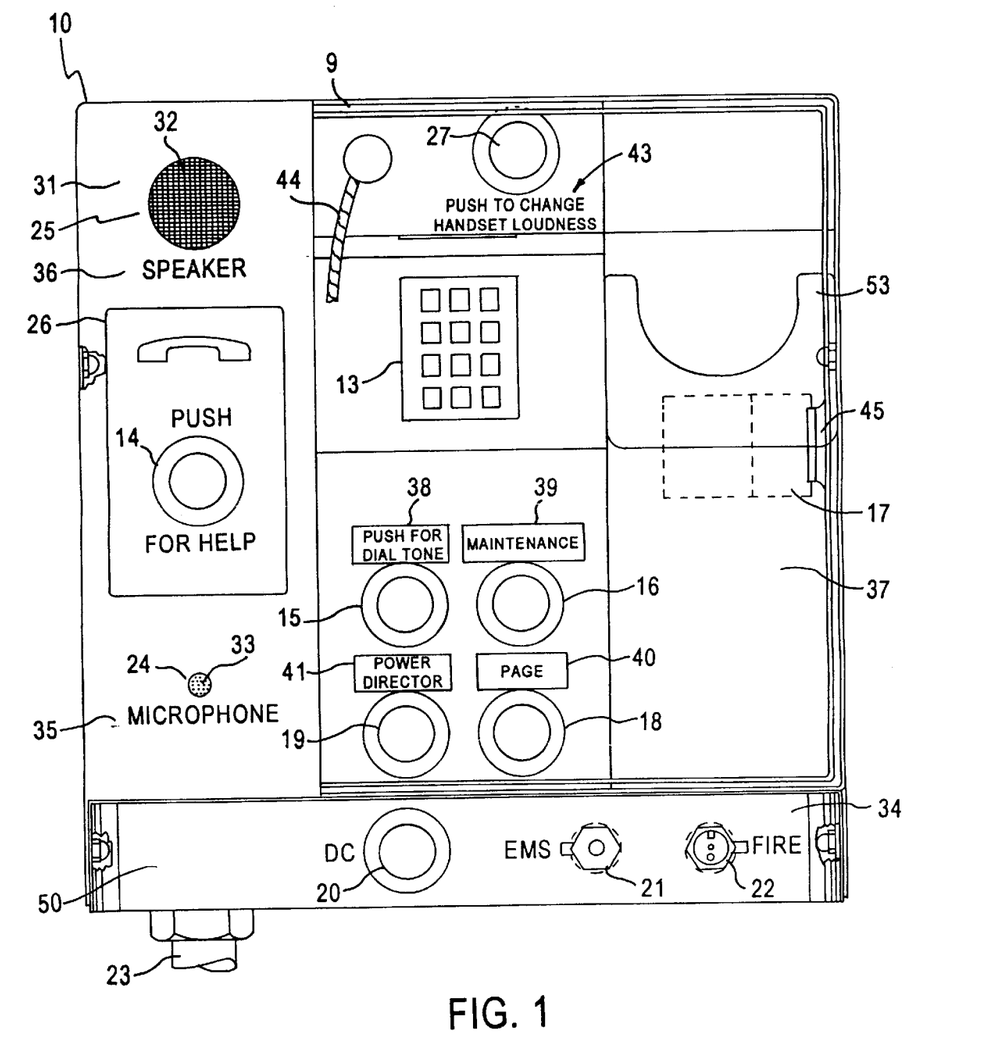
FIG. 1 is a front view of a communication safety station according to a preferred embodiment of the invention, with the front access panel open.

Referring to FIG. 1, when an emergency occurs along a railway wayside, the affected user will locate the nearest communications safety station 10. The user will depress the help button 14 which will cause the safety station to automatically dial a preprogrammed number to an operator at an emergency center. When such a call is placed, information about the location of the safety station is automatically available to the operator, and the user and the operator can communicate through the speaker 25 and microphone 24.

If the user is an emergency services provider, for example a fire fighter, and is equipped with a sound-powered communications jack, the user can plug the sound-powered jack into a mating jack 21 or 22 and communicate through the safety station to a similar user at another nearby safety station.

If the emergency requires that direct current traction power must be terminated, the user can advantageously depress the pushbutton 20 to disconnect the power and thereby prevent injury from electric shock or impact from a vehicle powered by the that electricity.

For non-emergency situations, the safety station can be utilized by maintenance crews to set up local communications, or to place telephone calls as may be required from time to time.

Figure 2:
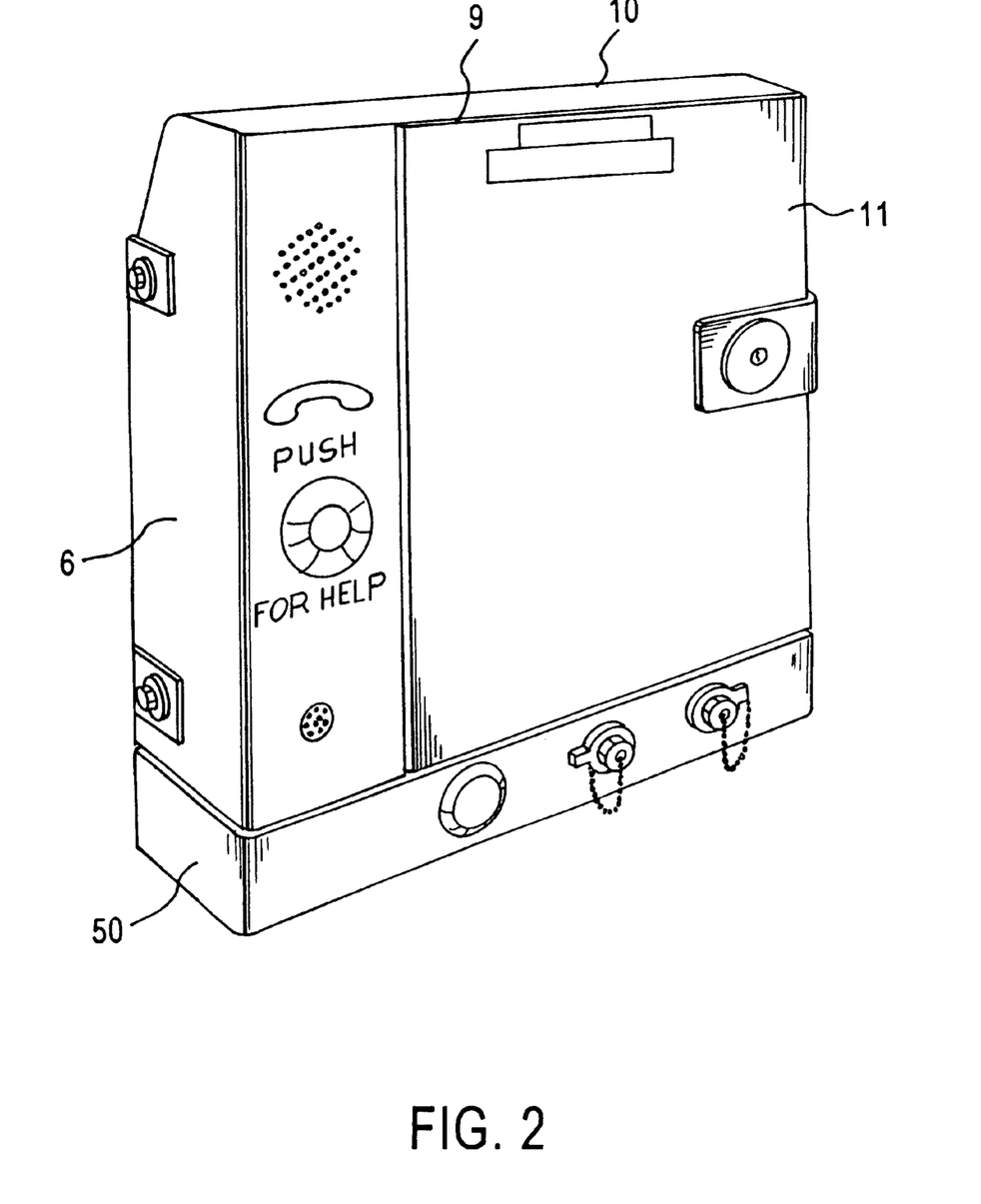
FIG. 2 is a perspective view of the communication safety station of FIG. 1, with the front access panel closed.
Figure 2A:
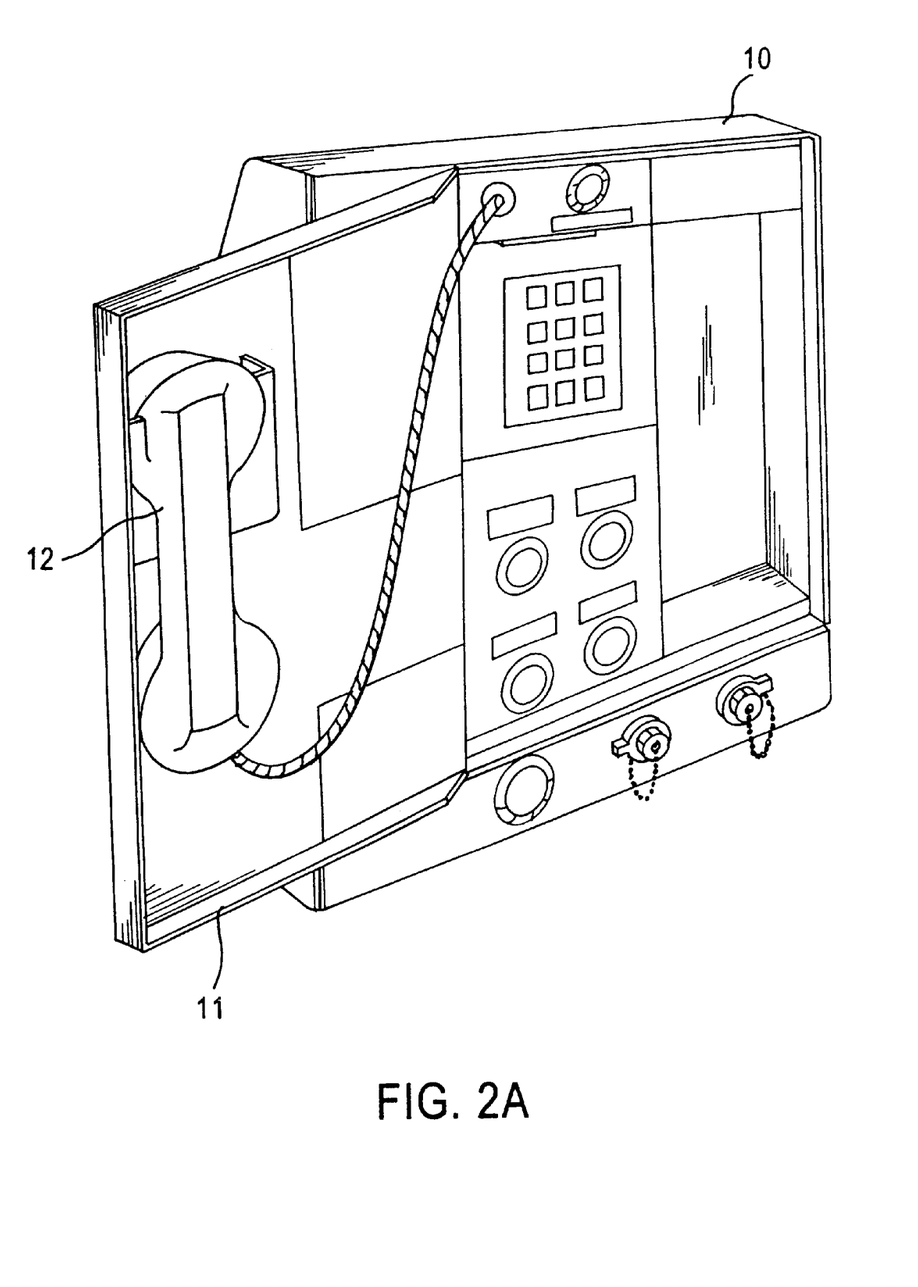
FIG. 2A is a perspective view similar to FIG. 2, with the front access panel open.
Figure 3:
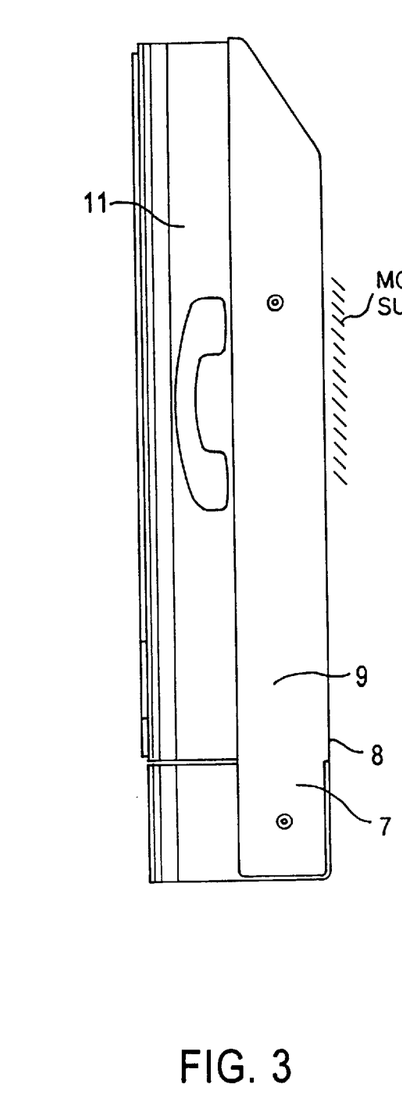
FIG. 3 a side elevational view of the communication safety station of FIG. 1.
Figure 4:
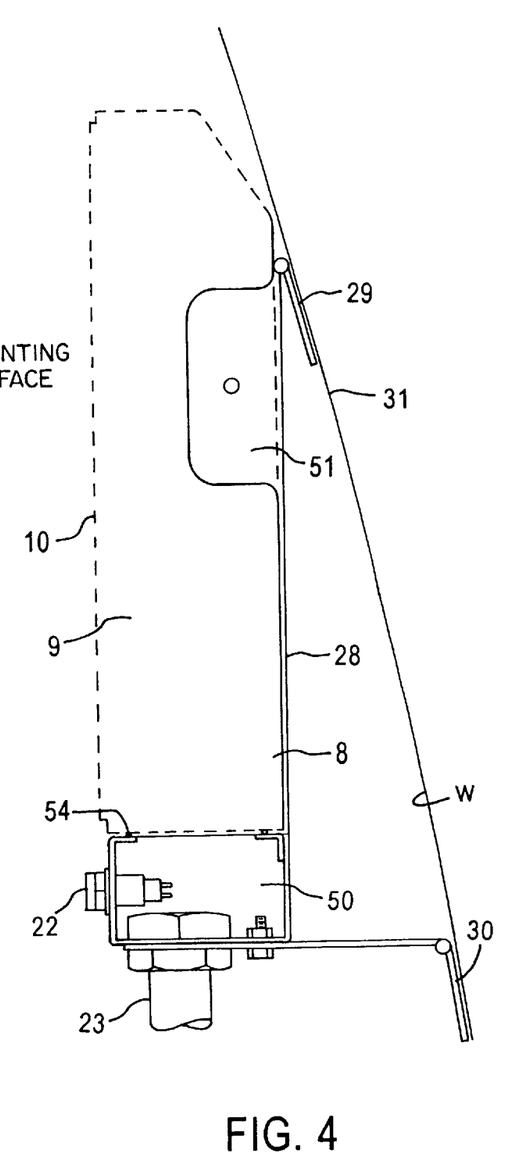
FIG. 4 is a side view of a mounting bracket for the communication safety station of FIG. 1.

Reference is now made to the safety station 10 shown in FIG. 2 in front elevational view with the front access panel 11 in the closed position, to FIG. 2A in front elevational view with front access panel 11 depicted in the open position, to FIG. 3 in side elevational view, and FIG. 4 in side elevational view attached to a mounting bracket 28. In FIG. 4, it can be seen that the safety station 10 is designed to be a multi-function unit having a low profile that can be located in an environment having little clearance, for example a sloping tunnel wall. The mounting bracket 28 attaches to an irregular shaped or a sloped surface W, and is hard-wired at 23 for power and communications. The safety station 10 attaches to the mounting bracket 28, and is characterized by low-cost installation with quick repair or replacement.

As shown in FIGS. 1, 2 and 3, safety station 10 comprises a housing 9 having a front panel 37, a rear panel 8, and two side panels 6,7. The rear panel 8 is adapted to conform generally to the slope of a tunnel wall 31 through the novel mounting bracket 28.

Referring to FIGS. 1 and 4, multi-function wayside communications safety station is comprised of a vandal-resistant housing 9 having a protective hinged door 11 (depicted in the open position in FIG. 2A). The safety station housing 9 is mounted, for example, in the unique manner described below, to sloping railway tunnel wall W, by means of a novel mounting bracket 28 (FIG. 4) and is connected to a telephone line through which communication occurs with a handset 12 connected to the safety station by way of an armored handset cable 44. When not in use, the handset 12 rests on a handset cradle 53 located on the door 11. The exposed surfaces and hardware of the safety station 10 and the door 11 are preferably generally fabricated from stainless steel, with a minimum thickness of 0.064 inch or No. 14 gauge, which is resistant to corrosion and resistant to physical abuse caused by acts of vandalism. All exposed corners and edges of the safety station 10 are preferably rounded to prevent injury to persons coming into contact with the unit.

The protective door 11 is preferably mounted to the safety station 10 through a compression spring having adequate tension to automatically close the door, with the spring being removable and replaceable. The door 11 is flush with the safety station in the closed position, and a latch 17 on the door engages a door strike 45 for positive closure. The latch 17 can be locking or non-locking. The door preferably has a smooth, anti-glare finish. The front panel 31 has vandal-resistant covered panel holes 32 and 33 to prevent the insertion of sharp instruments or the forcing of materials into the safety station 10.

A weather resistant speaker 25 and a weather resistant microphone 24 are mounted behind the covered front panel holes 32 and 33 to perform the function of a speakerphone, allowing a user to have hands free telephone voice communications via the safety station 10. A vandal-resistant pushbutton 14 is also mounted on the front panel 31 which, when depressed, activates the safety station to place an emergency help call and activates the speakerphone for voice communications. Placement of an emergency help call provides access to an operator, such as an operator at an emergency center. When an emergency help call is placed, information about the location of the safety station is available to the operator. A back lit, engraved and painted label 26 surrounds the pushbutton 14 allowing the pushbutton 14 to be seen in an area of low light, and instructs a user to push the button for help. Labels 35 and 36 are also engraved and painted identifying the microphone 24 and the speaker 25, respectively.

The inside front panel 37, which is may be covered by the hinged door 11 to provide environmental protection, has attached additional vandal-resistant pushbuttons 15,16,18, 19 and 27. All pushbuttons have a seal which prevents ambient moisture and ambient particulate from entering the safety station. The pushbuttons 15,16,18, 19 and 27 all have labels identifying their function. Label 38, associated with pushbutton 15, instructs the user to utilize pushbutton 15 to request a dial tone and access telephone communications via the handset 11 or the speakerphone. Once a dial tone is achieved, the user may then dial numbers from a touch tone keypad 26 to initiate a telephone call. Label 39, associated with pushbutton 16, instructs the user to utilize pushbutton 16 to request a maintenance party line permitting multiple safety stations 10 to interconnect within a predefined zone. By pressing the maintenance pushbutton 16, a conference bridge is created, and when this same pushbutton is thereafter depressed on another safety station within the predefined zone, that other safety station is joined in the call. Label 40, associated with pushbutton 18, instructs the user to utilize pushbutton 18 to access a page circuit, allowing the user to make an public address announcement which will be received by all safety stations 10 in a predefined zone, audible from the speaker 25. Label 41, associated with pushbutton 19, instructs the user to utilize pushbutton 19 to activate a call-down function that will connect the safety station 10 with an operator, particularly an operator at the Power Director location. Label 43, associated with pushbutton 27, instructs the user to utilize pushbutton 27 to adjust the receive volume of the handset 12.

The touch tone keypad 13 is mounted such that only the numbered buttons are accessible through the inside front panel 37, and is sealed from the inside resulting in environmental protection for the associated electronics. The touch tone keypad 13 is recessed at the top, at, for example, a 20 degree angle, providing the user with a more favorable viewing angle, and is back lit for viewing in low light environments. The keypad 13 is enabled whenever the phone is removed from the hook, either by lifting the handset 12 from the cradle 53, or by depressing the dial tone pushbutton 15.

FIG. 3 is a side view of the safety station 10 with the door 11 in the closed position. A seal is provided at the perimeter interface when the door 11 is closed to prevent ambient moisture and ambient particulate from entering the safety station interior.

FIG. 4 is the side view of the mounting bracket 28. The mounting bracket 28 is designed to adapt to the angle of a mounting surface, for example, a sloping tunnel wall 31. An upper hinge 29, extending generally the width of the mounting bracket 28, is used to attach the top portion of the mounting bracket to the mounting surface. Two laterally spaced lower hinges, located generally at 30, are available for attaching the lower portion of the mounting bracket to the mounting surface. It can readily be seen that as the slope of a mounting surface varies, the feature of separate top and bottom hinges advantageously allows the mounting bracket 28 to adapt to a sloping surface and be securely attached. Se mounting bracket 28 is generally fabricated from stainless steel to resist corrosion and physical abuse, with no sharp edges present to thereby prevent accidental injury to the user. The fit and finish of the mounting bracket 28 is such that it will blend with the safety station and have an aesthetically pleasing appearance.

Figure 5:
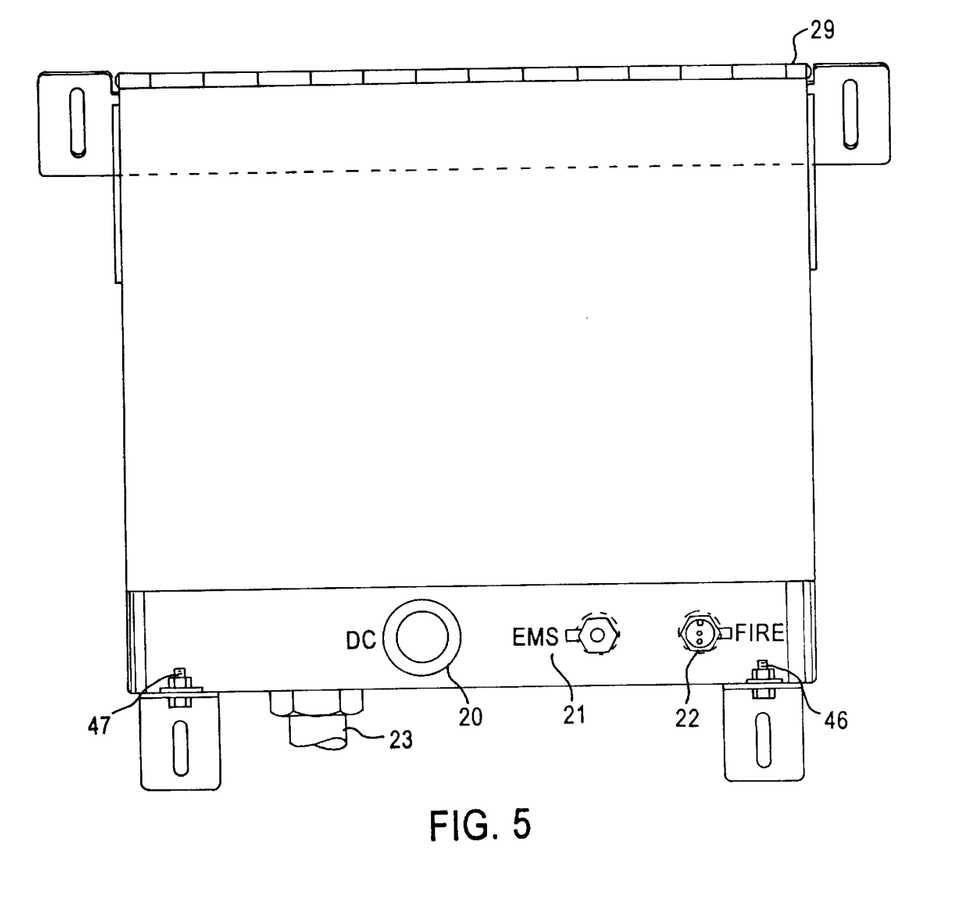
FIG. 5 is a front elevational view of the mounting bracket of FIG. 4.
Figure 6:
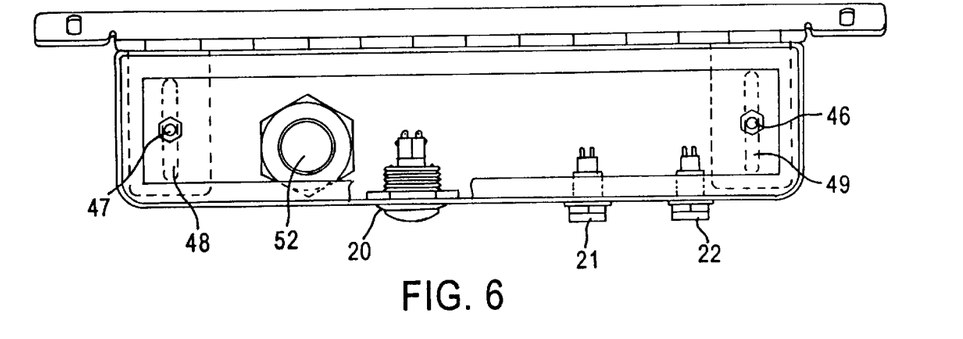
FIG. 6 is a top elevational view of the mounting bracket of FIG. 4.

The base 50 of the mounting bracket forms a channel-shaped area which acts both as a rest for the safety station 10 and as an additional location for safety station functions. Referring to FIGS. 5 and 6, this base 50 is slideably mounted to the mounting bracket 28 at slots 48 and 49, utilizing fasteners 46 and 47. The location of the base 50 relative to the lower hinge location 30 is determined by the slope of the mounting surface 31 in order to either place the safety station as close to the mounting surface as possible, or maintain the station 10 in a vertical orientation.

The mounting bracket base 50 contains an opening 52 fitted with a conduit 23 acting as a feed through for electrical connections, as best depicted in FIGS. 4 and 6. The conduit 23 has a seal preventing ambient moisture or ambient particulate from penetrating the base 50, and is vandal resistant.

A pushbutton 20 is mounted on the front of the mounting bracket base 50, identical in structure to the pushbuttons previously described, for use in disconnecting the direct current traction power used for powering nearby electric powered transportation. A user can depress pushbutton 20 and disconnect nearby electric power, advantageously preventing injury from electric shock or impact by a moving vehicle powered by that electricity.

Two voice powered jacks 21, 22 (FIG. 1) are also mounted on the front of the mounting bracket base 50 and are capable of interfacing with voice powered phones as may be required from time to time, such as the type utilized by the New York City Emergency Medical Services or the New York City Fire Department. The traction power disconnect pushbutton 20, and the voice powered system jacks 21,22 are all sealed to prohibit ambient moisture and ambient particulates from entering the base.

All power and telephone lines pass through the conduit 23 and either terminate at a base panel function (e.g. the traction power disconnect pushbutton or a voice powered system jack as noted above) or terminate at a mating connector(s) (not shown in detail but located within base 50). The mating connector is utilized for connecting the remaining functions to a corresponding mating connector of the safety station 10. The use of mating connectors (preferably of the quick disconnect type) allows the safety station 10 to be quickly mounted and mated to the mounting bracket 28, and allows for ease in disconnecting the safety station for repair or replacement. At the interface of the safety station 10 and the mounting bracket 28 is a gasket 54 (FIG. 4) which forms a seal preventing ambient moisture and ambient particulate from affecting the integrity of the electrical and telephonic connections and operations.

Figure 7:
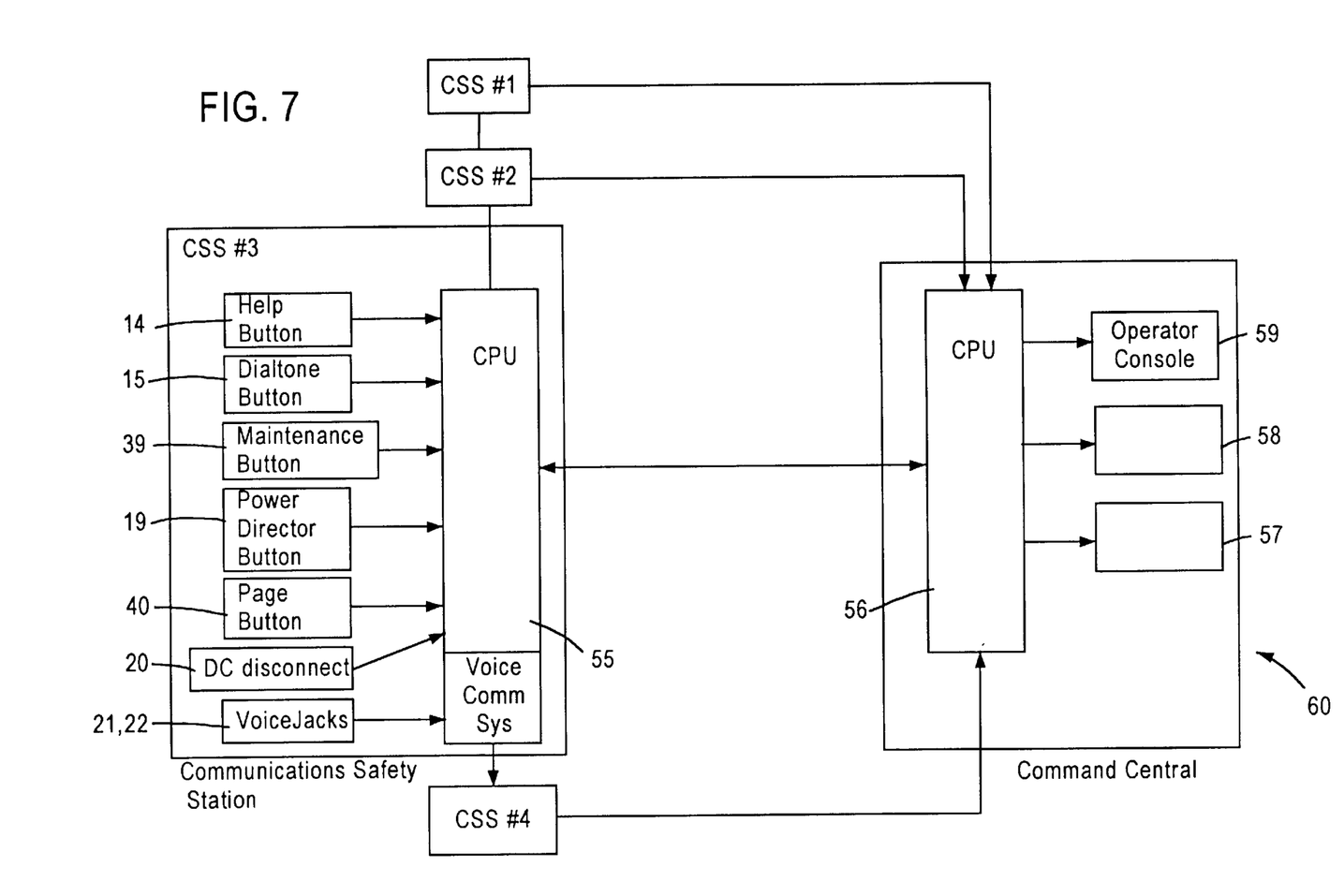
FIG. 7 is a block diagram of the major functions of a communications safety station.

FIG. 7 depicts a block diagram displaying the relationship between the pushbutton functions and the internal CPU 55, as well as the relationship between the safety stations within a given zone. All functions of the safety station 10 are connected to circuit boards or terminal strips located behind and inside the front panel 37, and which boards or strips are generally located in the vicinity of the function button or within the central processing unit, CPU 55, and are sealed from ambient moisture and ambient particulate. Also depicted in FIG. 7 is the relationship between the safety station 10 and a remote command central 60 with its related functions, for example, CPU 56, power director console 57, voice communication with operator station 58, and the operator console 59. All wires extending from the CPU 55 within station 10 that require outside connections to telephone and power lines are terminated at a mating connector (not shown), such as discussed above. The software and hardware necessary to implement the functions identified herein will occur to, and be enabled by, persons of ordinary skill in the relevant art upon review of this specification.

When a call is placed to the safety station 10, a locally audible ringing sound is generated, and continues until the call is either answered, cancelled by the caller, or a predetermined number of rings has occurred. An incoming call may take the form of a voice call, or may be a ring-down supervision call placed to the safety station 10 to determine the operational status of the unit, to audit the unit and collect responses from the unit.

Another unique function of the safety station unit 10 allows a caller located, for example, at remote location 60, to place a call to the unit and activate only the microphone of the speakerphone, allowing the caller to listen to nearby ambient sounds.

Yet another special function of the safety station 10 allows disconnected local traction power to be reset using access codes. The access codes may be entered either at the safety station 10 via the numeric keypad 13, or the codes may be generated remotely (e.g. as at 60) and sent by a caller.

In situations when there is an emergency and a user must quickly and efficiently place an emergency call, this invention has the unique ability that when the help pushbutton 14 is depressed all other functions in process are terminated, the telephone is disconnected, and the telephone is reconnected utilizing the emergency help commands generated when the pushbutton was depressed.

Power to the safety station 10 is preferably provided from the telephone tip and ring circuit and a 48 volt dc auxiliary power circuit supplying power to all functions other than tip and ring. If the 48 volt dc auxiliary power circuit is not active, the handset phone portion of the safety station 10 will still be workable. The safety station 10 will also be equipped with protection against surges induced on either the communication circuit or the power circuits. Failure of the dc auxiliary power circuit will have no affect on the ability of the safety station 10 to connect to the tip and ring circuit and the user's ability to place a phone call using the handset 12 and the keypad 13.

Another important feature of this invention is the use of a time-out circuit. Whenever a handset call is placed at the safety station 10, a timer is activated that limits the duration of telephone connection to a predetermined interval. When timed out, the handset is disabled until it is placed in its cradle and the phone is on hook. In this manner calls can always be placed from the safety station in the event the handset has been left off hook, either by action of a user or caused by vandalism.

Still another important feature of this invention is the notification to an Operator, particularly an Operator at the Power Director location, when the direct current traction power has been interrupted by a user of the safety station.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A wayside communications safety station comprising:
   (a) a telephone, connectable to a telephone line, to initiate and receive telephone service;
   (b) a plurality of manually actuable switches connected to said telephone to initiate a direct dial telephonic signal;
   (c) at least one voice powered system jack connectable through said wayside communications safety station to a voice powered communications system;
   (d) a further manually actuable switch, connectable to a direct current traction power control circuit adapted to supply electrical energy to move a vehicle, to selectively actuate said control circuit; and
   (e) means, mounted within said safety station, for resetting power to the control circuit.

2. A wayside communications safety station according to claim 1, further comprising a speakerphone, and means for remotely activating a microphone of the speakerphone, whereby said microphone is active for silent monitoring of an ambient area proximate the safety station.

3. A wayside communications safety station according to claim 1, wherein said telephone further includes a numeric key pad for generating tone signals.

4. A wayside communications safety station according to claim 3, wherein said means for resetting power to the control circuit includes means for generating a series of tones generated from said telephonic numeric keypad.

5. A wayside communications safety station according to claim 1, further comprising a handset containing a microphone and a speaker, and means for adjusting the volume of the handset speaker.

6. A wayside communications safety station according to claim 1, wherein each of the manually actuable switches are structured to be vandal proof.

7. A wayside communications safety station according to claim 1, wherein each of the manually actuable switches further comprises a moisture barrier, said moisture barrier preventing ambient moisture from entering the safety station.

8. A wayside communications safety station according to claim 1, wherein each of the manually actuable switches further comprises a particulate barrier, said particulate barrier preventing ambient particulates from entering the safety station.

9. A wayside communications safety station according to claim 1, further comprising means for connecting said safety station to a conference bridge, said conference bridge creating a conference call with other safety stations.

10. A wayside communications safety station according to claim 1, further comprising a public address phone access circuit.

11. A wayside communications safety station according to claim 10, further comprising a means for connecting said safety station to said public address phone access circuit.

\* \* \* \* \*